(12) United States Patent
van Batenburg et al.

(10) Patent No.: US 7,268,101 B2
(45) Date of Patent: Sep. 11, 2007

(54) FORMATE BASED LIQUID GEL CONCENTRATES

(75) Inventors: Diederik van Batenburg, Delft (NL); Morice Hoogteijling, Leiderdorp (NL)

(73) Assignee: Halliburton Energy Services, Inc., Duncan, OK (US)

( * ) Notice: Subject to any disclaimer, the term of this patent is extended or adjusted under 35 U.S.C. 154(b) by 241 days.

(21) Appl. No.: 10/713,796

(22) Filed: Nov. 13, 2003

(65) Prior Publication Data
US 2005/0107264 A1    May 19, 2005

(51) Int. Cl.
*E21B 43/00* (2006.01)
*C09K 8/582* (2006.01)

(52) U.S. Cl. .............. 507/211; 507/110; 507/209; 507/213; 507/273; 166/294

(58) Field of Classification Search ............... 507/110, 507/211, 213, 273
See application file for complete search history.

(56) References Cited

U.S. PATENT DOCUMENTS

| | | | |
|---|---|---|---|
| 4,336,145 A | 6/1982 | Briscoe | 252/8.55 |
| 4,342,866 A * | 8/1982 | Kang et al. | 536/119 |
| 4,466,890 A | 8/1984 | Briscoe | 252/8.55 |
| 4,536,297 A * | 8/1985 | Loftin et al. | 507/121 |
| 4,900,457 A * | 2/1990 | Clarke-Sturman et al. | 507/103 |
| 4,963,668 A * | 10/1990 | Allen et al. | 536/114 |
| 5,228,909 A * | 7/1993 | Burdick et al. | 106/162.8 |
| 5,629,271 A * | 5/1997 | Dobson et al. | 507/269 |
| 5,728,652 A * | 3/1998 | Dobson et al. | 507/145 |
| 5,762,140 A | 6/1998 | Hardy et al. | 166/295 |
| 5,785,747 A * | 7/1998 | Vollmer et al. | 106/194.2 |
| 5,836,392 A | 11/1998 | Urlwin-Smith | 166/295 |
| 6,024,170 A | 2/2000 | McCabe et al. | 166/300 |
| 6,103,671 A * | 8/2000 | Dobson et al. | 507/261 |
| 6,192,986 B1 | 2/2001 | Urlwin-Smith | 166/295 |
| 6,196,317 B1 | 3/2001 | Hardy | 166/295 |
| 6,239,081 B1 * | 5/2001 | Korzilius et al. | 507/145 |
| 6,454,005 B1 * | 9/2002 | Smith | 166/294 |
| 6,488,091 B1 | 12/2002 | Weaver et al. | 166/300 |
| 6,933,262 B1 * | 8/2005 | Chesser et al. | 507/212 |
| 2005/0101491 A1 * | 5/2005 | Vollmer | 507/112 |

* cited by examiner

*Primary Examiner*—David J. Buttner
*Assistant Examiner*—John J. Figueroa
(74) *Attorney, Agent, or Firm*—Robert A. Kent; Haynes and Boone, LLP

(57) ABSTRACT

A liquid gel concentrate for forming a high viscosity treating fluid is provided which can be premixed and stored before being used. The concentrate is comprised of an aqueous formate solution, at least one hydratable polymer which yields viscosity upon hydration and optionally an inhibitor having the property of reversibly reacting with the hydratable polymer in a manner whereby the rate of hydration of the polymer is retarded. Upon the selective reversal of the hydration inhibiting reaction the polymer is hydrated and high viscosity yielded thereby. The concentrate can be diluted with water to hydrate the hydratable polymer and form a large volume of high viscosity treating fluid.

2 Claims, No Drawings

FORMATE BASED LIQUID GEL CONCENTRATES

BACKGROUND

Many treatments and procedures are carried out in industry utilizing high viscosity fluids to accomplish a number of purposes. For example, in the oil industry, high viscosity well treating fluids are utilized in treatments to increase the recovery of hydrocarbons from subterranean formations such as by creating fractures in the formations or acidizing the formations. High viscosity fluids are also commonly utilized in well completion procedures. For example, during the completion of a well, a high viscosity completion fluid having a high density is introduced into the well to maintain hydrostatic pressure on the formation which is higher than the pressure exerted by fluids contained in the formation thereby preventing the formation fluids from flowing into the wellbore.

In the past, such high viscosity treating fluids have commonly been prepared by using a number of dry additives which are mixed with water or other aqueous fluids at the job site. A number of disadvantages are inherent in such mixing procedures, particularly when large volumes of treating fluids are prepared. For example, special mixing equipment for mixing the dry additives with water is required and problems such as chemical dusting, uneven mixing, lumping of gels while mixing and extended preparation and mixing time are involved. In addition, the mixing and physical handling of large quantities of dry chemicals require a great deal of manpower, and where continuous mixing is required, the accurate and efficient handling of chemicals such as salts, gelling agents, gel breakers, fluid loss control additives, complexers and surfactants is extremely difficult.

Such high viscosity treating fluids have also been prepared from oil-based or water-based liquid gel concentrates, each of which have certain advantages and disadvantages. One disadvantage of water-based liquid gel concentrates has been that only relatively low polymer loading, typically around 1 lb/gal, has been achieved whereas oil-based liquid gel concentrates have achieved a polymer loading of typically about 3-4 lb/gal. However, some oil-based liquid gel concentrates carry restrictions with respect to usage in areas where environmental restrictions apply.

There is a need for water based liquid gel concentrates that can achieve higher polymer loadings than conventional water based liquid gel concentrates and are also non-toxic, non-flammable and more environmentally acceptable than oil-based liquid gel concentrates.

DETAILED DESCRIPTION

The present embodiment provides liquid gel concentrates which can be utilized to form viscous fluids for carrying out a variety of subterranean well treatments such as fracturing subterranean formations, forming gravel packs in subterranean formations, forming temporary blocking in the well bore, and as completion fluids and drill-in fluids. The liquid gel concentrates are particularly useful in preparing fracturing fluids for generating one or more fractures in a subterranean formation.

The liquid gel concentrates contain substantially unhydrated polymer dispersed in a carrier. The liquid gel concentrates are used to transport the hydratable polymer in a slurry form which is much easier to handle than dry powder. It is desired that the slurry remain stable and the polymer not settle from it, or, if any settling does occur, that it is readily redispersed in the carrier. It is also generally easier to disperse the slurry into additional water to form a treating fluid than is dry powder. Generally the slurry can be mixed with additional water without the risk of formation of gel balls or fisheyes of partially hydrated gel.

The aqueous liquid gel concentrates of the present embodiment include a suspension of unhydrated hydratable polymers in a formate solution. The aqueous liquid gel concentrates are inhibited from yielding viscosity, i.e., the hydration rate of the unhydrated hydratable polymers is retarded in a manner whereby the concentrates can be premixed and stored either at the job site or at locations away from the job site. Prior to use, the hydratable polymers of the liquid gel concentrates are suspended in an unhydrated state in a formate solution. In this unhydrated form the liquid gel concentrates can be stored for long periods of time prior to use. The treating fluids are prepared at the job site by simply mixing the hydratable polymers of the liquid gel concentrates suspended in an unhydrated state in a formate solution with additional water and any required additives not already contained in the concentrates.

The preparation of a treating fluid from the concentrates involves metering the liquid gel concentrate into a blender wherein it is mixed with additional water and additives which also may be metered into the blender or otherwise added to the fluid. Alternatively, the fluid may be prepared by preblending or batch mixing from the concentrate. The mixture then is substantially simultaneously pumped out of the blender and into the subterranean formation to be treated by way of a well bore penetrating it. From when the metering, mixing and pumping process starts to when the formed treating fluid reaches the subterranean formation to be treated may involve a time period of only a few minutes which allows changes in the properties of the treating fluid to be made on the surface as required during the time the treating fluid is being pumped. For example, in a fracturing procedure carried out in a subterranean formation to stimulate production from the subterranean formation, changes can be made to the fracturing fluid during the pumping of the fluid in response to continuously monitored down hole parameters to achieve desired fracturing results, that is, the viscosity of the fracturing fluid, the amount of proppant material carried by the fracturing fluid and other properties of the fracturing fluid can be continuously measured on the surface and changed as required to achieve optimum down hole treatment results in real time.

A preferred aqueous liquid gel concentrate of this embodiment includes a formate solution, a hydratable polymer or mixture of polymers dispersed in the formate solution and an inhibitor. The hydratable polymer or polymers yield viscosity upon hydration and the inhibitor has the property of reversibly reacting with the hydratable polymer or polymers in a manner whereby the rate of hydration of the polymer is retarded. Upon a change in the pH condition of the concentrate such as by dilution and/or the addition of pH changing chemicals to the concentrate, the inhibition reaction is reversed and the polymer or polymers hydrate to yield viscosity. A viscous treating fluid prepared from the liquid gel concentrate preferably includes a variety of additives well known to those of ordinary skill in the art such as proppants, pH adjusting compounds, buffers, dispersants, surfactants for preventing the formation of emulsions between the treating fluid and subterranean formation fluids, bactericides, clay stabilizers and the like which do not adversely react with the other components of the high viscosity treating fluid or the subterranean formation fluids.

The formate solution is preferably a 75% solution of potassium formate in water. Other formates such as sodium formate and cesium formate may also be used. The formate solution disperses and suspends the hydratable polymer or polymers of the liquid gel concentrates of this embodiment.

The water used to prepare the formate solution utilized in the liquid gel concentrates of this embodiment can be fresh water or other waters. The water utilized in the preparation of viscous fluids for treating subterranean formations also may include a salt such as potassium chloride or a salt substitute such as tetramethylammonium chloride to help minimize the swelling of clays and the chance of damage to the subterranean formation upon contact with the fluid, however, such materials are generally not required according to the present embodiment.

The hydratable polymers of the liquid gel concentrates of the present embodiment include natural and derivatized polysaccharides which are soluble, dispersible or swellable in an aqueous liquid to yield viscosity to the liquid. Hydratable polymers which are suitable for use in accordance with the present embodiment include polymers which contain, in sufficient concentration and reactive position, one or more hydroxyl, cis-hydroxyl, carboxyl, sulfate, sulfonate, amino or amide functional groups. Particularly suitable hydratable polymers include polysaccharides and derivatives thereof which contain one or more of the following monosaccharide units: galactose, mannose, glucoside, glucose, xylose, arabinose, fructose, glucuronic acid or pyranosyl sulfate. Natural hydratable polymers containing the foregoing functional groups and units include guar gum and derivatives thereof, locust bean gum, tara, konjak, tamarind, starch, cellulose, karaya gum, xanthan gum, tragacanth gum, arabic gum, ghatti gum, tamarind gum, carrageenan and derivatives thereof. Modified gums such as carboxyalkyl derivatives, like carboxymethyl guar, and hydroxyalkyl derivatives, like hydroxypropyl guar can also be used. Doubly derivatized gums such as carboxymethylhydroxypropyl guar (CMHPG) can also be used.

Hydratable synthetic polymers and copolymers which contain the above-mentioned functional groups and which can be utilized in accordance with the present invention include, but are not limited to, polyacrylate, polymethacrylate, polyacrylamide, maleic anhydride, methylvinyl ether copolymers, polyvinyl alcohol, and polyvinylpyrrolidone.

A preferred hydratable polymer of the liquid gel concentrates of the present embodiment is a depolymerized polysaccharide polymer, such as depolymerized hydroxypropylguar, the manufacture and description of which is described in U.S. Pat. No. 6,488,091, the entire disclosure of which is hereby incorporated herein by reference.

Modified celluloses and derivatives thereof can also be included in the liquid gel concentrates of the present embodiment, for example, cellulose ethers, esters and the like. In general, any of the water-soluble cellulose ethers can be used. Those cellulose ethers include, among others, the various carboxyalkylcellulose ethers, such as carboxyethylcellulose and carboxymethylcellulose (CMC); mixed ethers such as carboxyalkylethers, e.g., carboxymethylhydroxyethylcellulose (CMHEC); hydroxyalkylcelluloses such as hydroxyethylcellulose (HEC) and hydroxypropylcellulose; alkylhydroxyalkylcelluloses such as methylhydroxypropylcellulose; alkylcelluloses such as methylcellulose, ethylcellulose and propylcellulose; alkylcarboxyalkylcelluloses such as ethylcarboxymethylcellulose; alkylalkylcelluloses such as methylethylcellulose; hydroxyalkylalkylcelluloses such as hydroxypropylmethylcellulose; derivatized cellulose such as vinyl phosphonic acid grafted hydroxyethylcellulose; and the like.

Preferred hydratable polymers which yield high viscosities upon hydration, i.e., apparent viscosities in the range of from about 10 centipoises to about 80 centipoises at a concentration in the range of from about 10 lbs/1000 gals. to about 80 lbs/1000 gals. in water, are guar gum and guar derivatives such as hydroxypropyl guar, depolymerized hydroxypropyl guar, carboxymethylguar, and carboxymethyl hydroxypropyl guar. Generally, such polymers can be present in the aqueous liquid gel concentrates in an amount in the range of from about 100 to about 6000 lbs/1000 gals. of formate solution. The hydration of the polymers can be inhibited or retarded, when necessary, by various inhibitors which may be added to the concentrates in an amount in the range of from about 0.01 to about 200 lbs/1000 gals. of formate solution. The reversal of the inhibition of hydration of such polymers can be accomplished by diluting the concentrate with water.

Tests were conducted to determine if the presence of formates had any effect on the hydration behavior of the polymers present in the liquid gel concentrates of the present embodiment. The tests were conducted by comparing the hydration of a conventional water based liquid gel concentrate to a formate based liquid gel concentrate. The formates did not appear to have a negative effect on the hydration behavior of the polymers.

Various compounds can be utilized with the above-mentioned hydratable polymers in an aqueous liquid gel concentrate composition to inhibit or retard the hydration rate of the polymers, and therefore, delay a viscosity increase in the liquid gel concentrate for a required period of time. Generally, any compound can be used as an inhibitor for a hydratable polymer if the compound reacts or otherwise combines with the polymer to cross-link, form a complex or otherwise tie-up the functional groups of the polymer whereby the rate of hydration of the polymer is retarded. It has been found that with various hydratable polymers, such as depolymerized polysaccharides, the formate alone present in the liquid gel concentrate can inhibit hydration of the hydratable polymer. Preferred inhibitors for the liquid gel concentrate composition of the present embodiment include any of the well known borate releasing compounds.

The liquid gel concentrates of the present embodiment may also include basic compounds such as sodium hydroxide, potassium hydroxide, amines and organic bases to adjust the pH of the concentrates to a range where the inhibitor or inhibitors utilized inhibit the hydration of the hydratable polymer or polymers. In addition, in some of the liquid gel concentrates, the basic compound or compounds alone function to inhibit or supplement the inhibition of the polymer or polymers. A preferred pH adjusting compound includes sodium hydroxide.

In order to give the liquid gel concentrates an initial viscosity, preferably within the range of from about 15 centipoises to about 300 centipoises, whereby suspended materials in the concentrate are maintained in suspension during the storage and handling thereof, a suspending agent or mixture of agents such as a quantity of succinoglucan biopolymer, available from Halliburton under the trade name "FLO-PAC" or welan gum available from CP Kelco US, or other similar materials or mixtures thereof which are well known to those of ordinary skill in the art may be included in the concentrate.

A preferred liquid gel concentrate of the present embodiment includes a potassium formate solution, one or more hydratable polymers selected from guar gum, hydroxypropyl guar, depolymerized hydroxypropyl guar, carboxymethyl guar and carboxymethylhydroxypropyl guar present in the concentrate in an amount in the range of from about 100 to about 6000 lbs/1000 gals. of formate solution. The liquid gel concentrate preferably includes an inhibitor present in the fluid in an amount in the range of from about 0.1 to about 1000 lbs/1000 gals. of fluid which in some instances may be a boron compound such as "Polybor" which is commercially available from U.S. Borax or a base such as sodium hydroxide present in an amount sufficient to adjust the pH thereof to a value in the range of from about 9 to about 14. In a preferred embodiment, the inhibitor is present in the aqueous treating fluid in an amount in the range of from about 2 to about 20 lbs/1000 gals. of fluid, most preferably from about 6 to about 12 lbs/1000 gals. of fluid, and a base such as sodium hydroxide present in an amount to adjust the pH of the fluid to a value in the range of from about 9 to about 14. For the most preferred fluid described above, a quantity of sodium hydroxide of about 30-200 lbs/1000 gals. of fluid is utilized.

The methods of the present embodiment of treating a subterranean formation penetrated by a well bore include the following steps. A liquid gel concentrate is prepared that includes a formate solution, an unhydrated hydratable polymer, and optionally an inhibitor to inhibit or retard the hydration rate of the polymer, and therefore, delay a viscosity increase in the liquid gel concentrate for a required period of time. In preparing a preferred concentrate, a borate inhibitor is combined with a formate solution followed by the addition of sodium hydroxide to adjust the pH of the mixture to a value in the range of from about 9 to about 14. A hydratable polymer is then combined with the mixture to produce an aqueous hydration inhibited concentrate having a storage life in the range of from at least about one month up to about 10 months depending on the specific formulation used. The inhibitor retards the rate of hydration of the hydratable polymer in the concentrate, but hydration of the hydratable polymer gradually occurs with time. Thus, the effective storage life of the concentrate is the time period between when the concentrate is initially prepared and when the concentrate attains a viscosity such that it cannot effectively be handled or pumped, i.e., a viscosity above about 500 centipoises. The term "storage life" is used hereinafter to mean the time period between preparation of a concentrate and when the concentrate reaches a viscosity of about 500 centipoises. In utilizing the liquid gel concentrates of the present embodiment to produce a large volume of highly viscous treating fluid, the concentrates are diluted with additional water whereby the inhibition reaction between the hydratable polymer and inhibitor contained in the concentrate is reversed and the hydratable polymer yields viscosity to form a viscous treating fluid which is then introduced into the subterranean formation to be treated.

The mixing of the concentrate with the additional water can be carried out in a batch process or a continuous process. Preferably, the mixing of the concentrate with additional water is carried out continuously as the high viscosity treating fluid produced is introduced into the formation. The particular quantity of water combined with the liquid gel concentrate depends on the quantity and type of hydratable polymer contained in the concentrate as well as the desired viscosity of the resulting treating fluid. By way of example, a concentrate containing 800 lbs. of hydroxypropyl guar per 1000 gallons of water can be diluted with 15 parts of additional water per part of concentrate to produce a fluid having a viscosity in the range of from about 30 to about 35 centipoises.

The liquid gel concentrates of this embodiment and high viscosity fluids produced therefrom can be utilized in a great variety of applications including, but not limited to, suspending explosive materials used in mining, drilling and other similar applications, carrying out production stimulation procedures in oil, gas and water wells, carrying out subterranean well completions, transporting proppant or other materials into desired areas in subterranean well formations, diverting fluids in subterranean well formations and carrying out cleaning procedures such as in cleaning tubular goods, production equipment and industrial equipment.

The high viscosity treatment fluids produced from the liquid gel concentrates are particularly suitable as treating fluids in carrying out subterranean well formation fracturing procedures. In this application, the liquid gel concentrates of the present embodiment provide particular advantages in addition to those mentioned above. More particularly, a variety of techniques can be utilized to control the viscosity of the treating fluids produced from the liquid gel concentrates during use.

As will be understood by those skilled in the art, other techniques can be utilized to control the hydration of all or part of the hydratable polymers used in the liquid gel concentrates to produce treating fluids having desired viscosities at desired times while treatments using the fluids are carried out.

In order to further illustrate the liquid gel concentrates and methods of this invention, the following examples are given:

EXAMPLE 1

Various hydratable polymers were combined with a 75% solution of potassium formate commercially available from Hydro Formates under the trade designation PF75 to determine if a formate solution is an effective suspension agent for an aqueous liquid gel concentrate. The compositions of this Example, optionally include one or both of a borate inhibitor commercially available from US Borax under the trade designation Polybor and sodium hydroxide. The results of these tests are given in Table I below.

TABLE I

| Component | LGC 311 Amount | LGC 312 Amount | LGC 313 Amount | LGC 314 Amount | LGC 315 Amount | LGC 316 Amount |
| --- | --- | --- | --- | --- | --- | --- |
| Hydro PF75 (ml) | 200 | 200 | 200 | 200 | 200 | 200 |
| Polybor (g) | | | | 0.2 | | |
| NaOH (g) | | | 1.6 | 1.6 | 1.6 | 1.6 |
| Depolymerized hydroxypropyl guar (g) | 24 | | | | 24 | 24 |
| Guar (g) | | 24 | 24 | 24 | | |

All of the LGC's except for LGC 312 floated in the liquid phase for a period of 10 months. This was an indication that the formate solution was an effective suspension agent since the polymer was storage stable and little agitation was necessary to uniformly redisperse the polymer to make a uniform solution for introduction into a mixer for mixing with other chemicals to form a high viscosity treatment fluid. It is believed that LGC 312 failed due to too high a concentration of dry polymer in combination with the absence of an inhibitor and/or the absence of sodium hydroxide. Otherwise, the concentrates had good stability and storage lives.

EXAMPLE 2

Guar gum, a hydratable polymer, was combined with a 75% solution of potassium formate commercially available from Hydro Formates under the trade designation PF75 and 6.4 g/l sodium hydroxide to determine if a formate solution is an effective suspension agent for an aqueous liquid gel concentrate. The compositions of this Example, also included a borate inhibitor commercially available from US Borax under the trade designation Polybor. Some compositions of this Example also included a succinoglucan biopolymer commercially available from Halliburton under the trade designation FLO-PAC. The results of these tests are given in Table II below.

TABLE II

| Component | LGC 341 Amount | LGC 342 Amount | LGC 343 Amount | LGC 344 Amount | LGC 345 Amount |
|---|---|---|---|---|---|
| Hydro PF75 (ml) | 190 | 190 | 190 | 190 | 200 |
| Polybor (g) | 0.2 | 0.2 | 0.2 | 0.2 | 0.2 |
| NaOH (g) | 1.2 | 1.2 | 1.2 | 1.2 | 1.3 |
| Water (ml) | 9.1 | 9.1 | 9.1 | 9.1 | |
| FLOPAC (ml) | 0.9 | 0.9 | 0.9 | 0.9 | |
| Guar (g) | 24 | 48 | 72 | 96 | 72 |

All of the LGC's except for LGC 341 were solid after 1 hour. LGC 341 had good suspension characteristics for a period of more than 2 weeks. It is believed that all of the LGC's except for Gel 341 failed due to too high a concentration of dry polymer in combination with a too small amount of sodium hydroxide despite the presence of an inhibitor.

EXAMPLE 3

Various hydratable polymers were combined with a 75% solution of potassium formate commercially available from Hydro Formates under the trade designation PF75 to determine if a formate solution was an effective suspension agent for an aqueous liquid gel concentrate. The results of these tests are given in Table III below.

TABLE III

| Component | LGC 351 Amount | LGC 352 Amount | LGC 353 Amount | LGC 354 Amount | LGC 355 Amount | LGC 356 Amount | LGC 357 Amount |
|---|---|---|---|---|---|---|---|
| Hydro PF75 (ml) | 200 | 200 | | | 200 | 200 | 100 |
| Welan gum (g) | | | 0.5 | 0.5 | | | 0.25 |
| Polybor inhibitor (g) | | | | 0.2 | | 0.4 | |
| NaOH (g) | 2.6 | 2.6 | 0.8 | 0.8 | 2.6 | 2.6 | 1.7 |
| Depolymerized hydroxypropyl guar (g) | 48 | 72 | 24 | | 96 | | 48 |
| Guar (g) | | | | 24 | | 48 | |

All of the LGC's except for LGC 355 floated in the liquid phase for a period of about 10 months. This was an indication that the formate solution was an effective suspension agent since the polymer was storage stable and little agitation was necessary to uniformly redisperse the polymer to make a uniform suspension for introduction into a mixer for mixing with other chemicals to form a high viscosity treatment fluid. It is believed that LGC 355 failed due to too high a concentration of dry polymer in combination with the absence of an inhibitor. Otherwise the concentrates had good stability and storage lives.

EXAMPLE 4

Various hydratable polymers were combined with a 75% solution of potassium formate commercially available from Hydro Formates under the trade designation PF75 to determine if a formate solution was an effective suspension agent for an aqueous liquid gel concentrate. The results of these tests are given in Table IV below.

TABLE IV

| Component | LGC 361 Amount | LGC 362 Amount | LGC 363 Amount | LGC 364 Amount | LGC 365 Amount | LGC 366 Amount |
|---|---|---|---|---|---|---|
| Hydro PF 75 (ml) | 199 | 198 | 199 | 199 | 199 | 198 |
| NaOH (g) | 2.5 | 2.3 | 2.6 | 2.6 | 2.6 | 2.3 |
| FLO-PAC (ml) | 1.0 | 2.0 | 1.0 | 1.0 | 1.0 | 2.0 |
| Depolymerized hydroxypropyl guar (g) | | | 24 | | | |
| Guar (g) | 24 | 24 | | 48 | | 48 |
| Hydroxypropyl guar (g) | | | | | 36 | |

All of the LGC's except for LGC 364 floated in the liquid phase for a period of about 3 weeks. This was an indication that the formate solution was an effective suspension agent since the polymer was storage stable and little agitation was necessary to uniformly redisperse the polymer to make a uniform solution for introduction into a mixer for mixing with other chemicals to form a high viscosity treatment fluid. It is believed that LGC 364 failed due to too high a concentration of dry polymer in combination with the absence of an inhibitor. Otherwise the concentrates had good stability and storage lives.

Although only a few exemplary embodiments have been described in detail above, those skilled in the art will readily appreciate that many other modifications are possible in the exemplary embodiments without materially departing from the novel teachings and advantages described herein. Accordingly, all such modifications are intended to be included within the scope of the following claims.

What is claimed is:

1. A liquid gel concentrate composition, comprising:
   at least one unhydrated hydratable polymer dispersed in an aqueous sodium formate solution and an inhibitor, wherein sodium formate together with the inhibitor comprising a boron compound and a pH adjusting compound in the aqueous formate solution, inhibits hydration of the at least one unhydrated hydratable polymer, wherein the at least one unhydrated hydratable polymer yields viscosity upon hydration, the unhydrated hydratable polymer comprising a polysaccharide selected from the group consisting of guar gum, depolymerized hydroxypropyl guar, carboxymethyl guar and carboxymethylhydroxypropyl guar, and being present in an amount of from about 100 to about 6000 lbs/1000 gals of the aqueous sodium formate solution; and
   a suspending agent comprises a succinoglucan biopolymer for suspending the at least one unhydrated hydratable polymer in the liquid gel concentrate.

2. A liquid gel concentrate composition according to claim 1, wherein the pH adjusting compound comprises sodium hydroxide.

* * * * *